United States Patent [19]

Shiralkar et al.

[11] Patent Number: 4,755,348
[45] Date of Patent: Jul. 5, 1988

[54] COOLED WATER ROD (LOCA CONDITIONS)

[75] Inventors: Bharat S. Shiralkar, San Jose; Gary E. Dix, Saratoga; Jens G. M. Andersen, Cupertino, all of Calif.

[73] Assignee: General Electric Company, San Jose, Calif.

[21] Appl. No.: 2,475

[22] Filed: Jan. 12, 1987

[51] Int. Cl.⁴ ............................................. G21C 15/18
[52] U.S. Cl. ................................... 376/282; 376/371; 376/444; 376/447
[58] Field of Search ............... 376/282, 435, 439, 444, 376/371, 447

[56] References Cited

U.S. PATENT DOCUMENTS

| | | | |
|---|---|---|---|
| 3,357,891 | 12/1967 | Wadmark | 376/282 |
| 3,802,995 | 4/1974 | Fritz et al. | 376/435 |
| 4,123,327 | 10/1978 | Sugisaki et al. | 376/282 |
| 4,675,154 | 6/1987 | Nelson et al. | 376/439 |

FOREIGN PATENT DOCUMENTS

| | | | |
|---|---|---|---|
| 2282697 | 4/1976 | France | 376/282 |
| 0059293 | 5/1977 | Japan | 376/282 |
| 0147190 | 12/1978 | Japan | 376/282 |
| 0129285 | 6/1979 | Japan | 376/282 |

Primary Examiner—Deborah L. Kyle
Assistant Examiner—Richard Wendtland
Attorney, Agent, or Firm—Robert R. Schroeder

[57] ABSTRACT

An apparatus and process utilizing a large water rod of a fuel bundle in a boiling water reactor fuel assembly as a radiation heat sink during a loss of coolant accident. Core cooling spray is collected at the top end of the bundle's large water rod by a collector and distributed by a distributor to coat the inside wall surfaces of the water rod. In the case of a water rod which is not bottom vented, the water rod body is modified so as to separate the downward flow of liquid water from the upward flow of steam. During normal plant operation, the large water rod serves as a water-filled moderator tube to provide a more uniform power distribution across the fuel bundle.

12 Claims, 4 Drawing Sheets

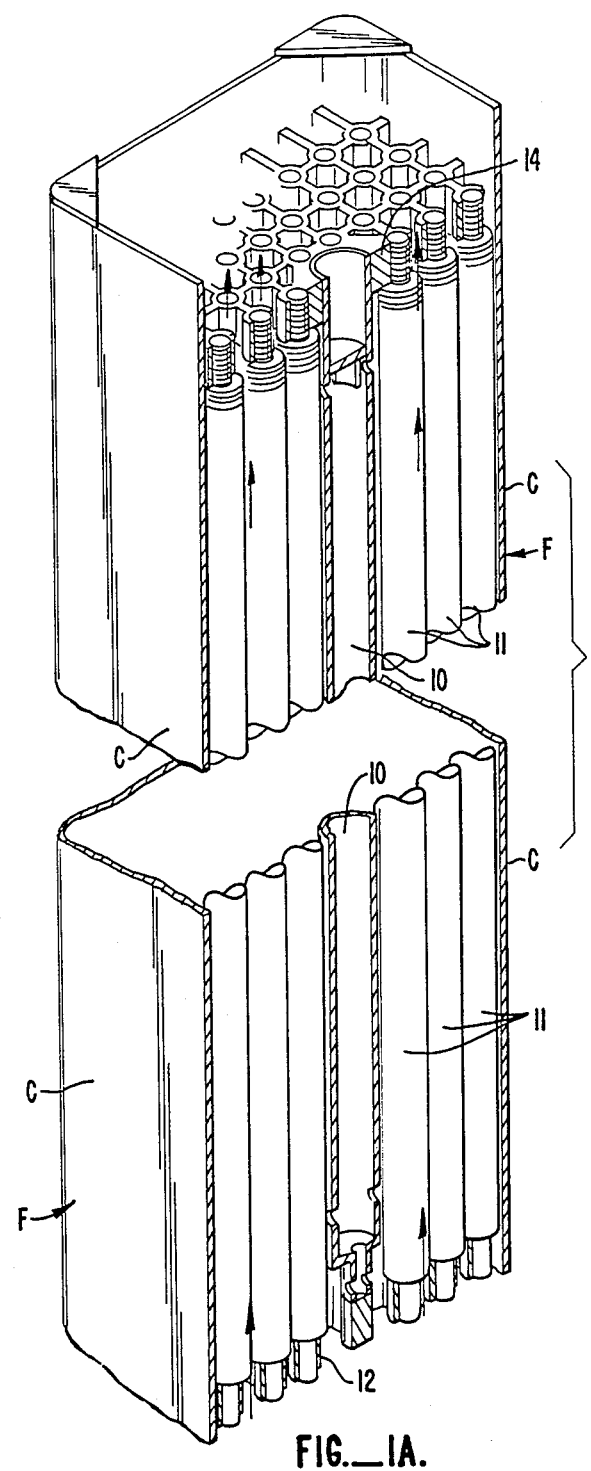
FIG._1A.

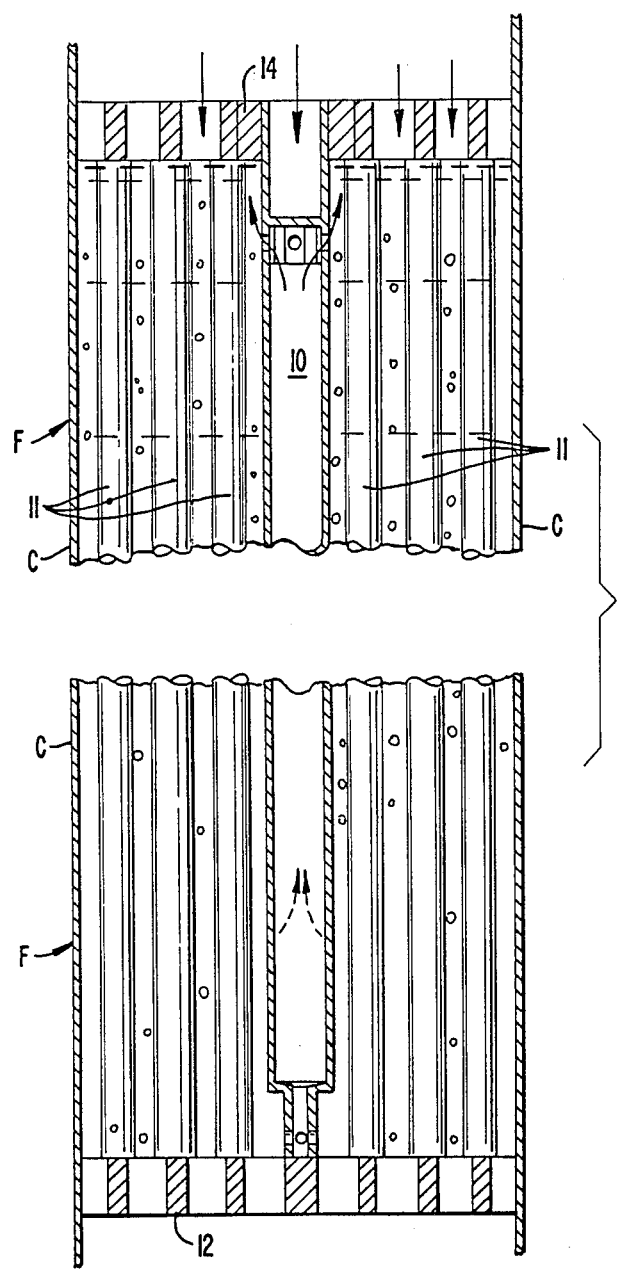
FIG._1B.

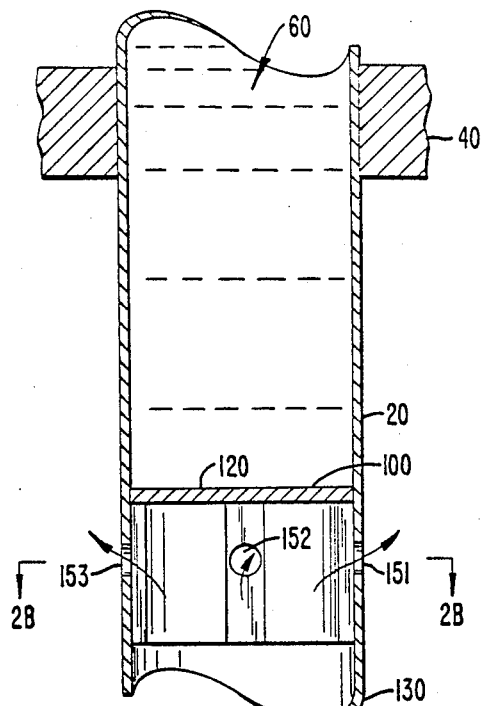
FIG._2A.
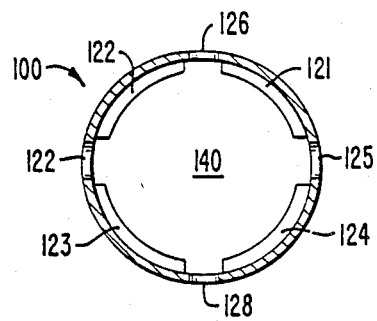
FIG._2B.
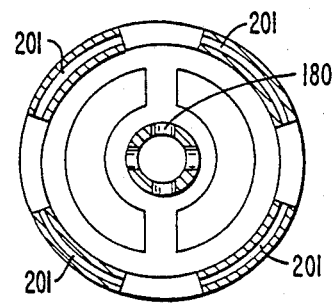
FIG._3B.
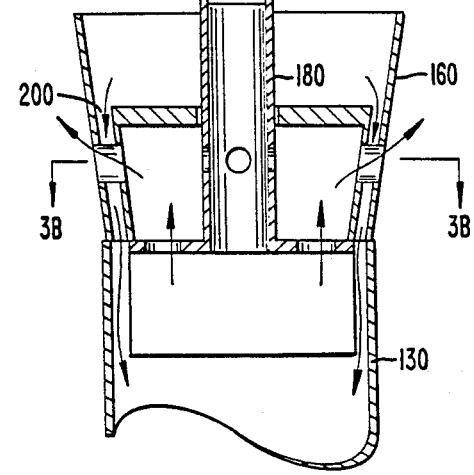
FIG._3A.
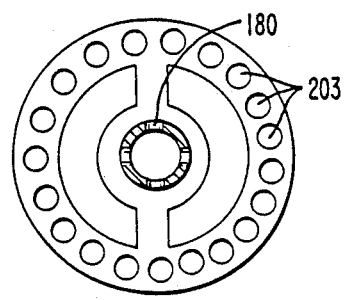
FIG._3C.

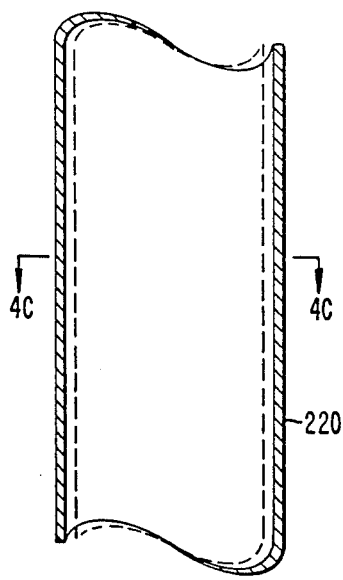
FIG._4A.
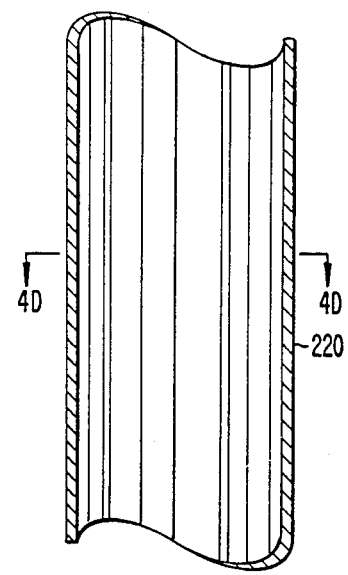
FIG._4B.
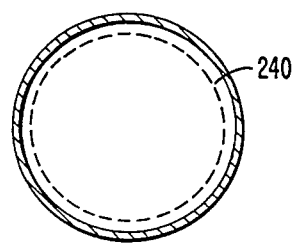
FIG._4C.
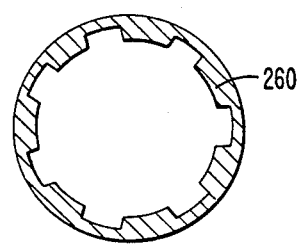
FIG._4D.
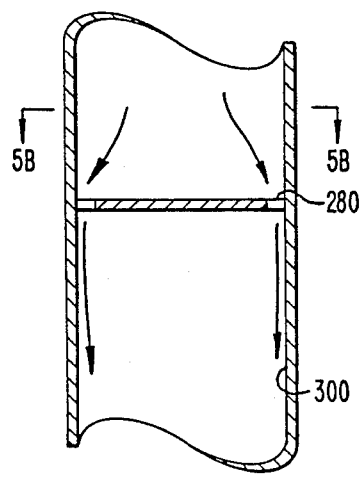
FIG._5A.
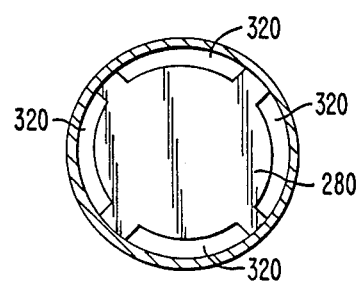
FIG._5B.

COOLED WATER ROD (LOCA CONDITIONS)

BACKGROUND OF THE INVENTION

1. Field of the Invention

The present invention relates to an improved apparatus and process for providing a thermal radiation heat sink in a fuel bundle having a large water rod for use in a boiling water nuclear reactor. The apparatus and process provide the dual functions of neutron moderation during normal operating conditions and radiation sink during a loss of coolant accident.

2. Description of Related Art

The present invention is applicable to boiling water reactors of the type wherein an overhead core cooling spray (CCS) is used during loss of coolant accidents (LOCAs). Specifically, the invention relates to fuel bundle assemblies in which a relatively large diameter water rod is disposed within the array of fuel rods to provide increased neutron moderation. For the purposes of this invention, "large" is used to describe a tube having a diameter at least twice the diameter of the fuel rods. The large water rod is usually centrally located and under normal operating conditions is filled with water as a neutron moderator to provide an even power output distribution across the fuel bundle.

In a LOCA situation, the water drains out of the fuel assemblies and the large water rod. The control rods are fully inserted to stop the fission, but residual energy due to decay of fission products continues to be produced for a period of time. The emergency CCS is activated and water sprays across the top of the fuel assemblies from a number of directions The upper tie plate, which ties together the fuel assemblies, partially obscures the fuel rods from the water. Due to the depressurization and high temperatures associated with a LOCA, much of the spray flashes to steam. In order to dissipate the residual heat effectively, it is necessary to provide heat sinks for the fuel rods wherever possible.

The large water rod is orificed at its lower end and discharges water under normal operating conditions into the fuel bundle through holes just beyond the active fuel length.

SUMMARY OF THE INVENTION

In a BWR of the type wherein an overhead CCS system is used in the event of a LOCA, an apparatus and process for improved fuel rod cooling is disclosed for fuel bundles having a large water rod.

The process consists of collecting the CCS water from above and through the upper tie plate and distributing the water along the interior wall surfaces of each large water rod, while separating the upward steam flow from the downward flowing water. The thin film of downward flowing water along the inner wall surfaces of the large water rod provides a radiation heat sink for the residual fission energy.

The apparatus consists of replacing the existing large water rods with a modified water rod to serve the dual purposes of a moderator during normal operating conditions and a heat sink when there is a LOCA. The apparatus consists of, from top to bottom, a collector, a distributor and a body.

The collector is the uppermost portion of the apparatus which captures the CCS water through or below the upper tie plate. The distributor then disperses the CCS water along the periphery of the inner wall surfaces of the body which extends longitudinally below the collector and distributor the length of the fuel assembly. Separate water paths and steam paths are provided along the tubular body and through the distributor such that the upward-moving flow of steam does not inhibit the downward flow of cooling water.

BRIEF DESCRIPTION OF THE FIGURES

FIG. 1A is a perspective view of fuel bundle and channel between upper and lower tie plates with fuel rods and central large water rod shown;

FIG. 1B is a section similar to FIG. 1A with the fuel bundle and channel between the upper and lower tie plates undergoing a LOCA with coolant paths and steam paths specifically illustrated;

FIG. 2A is a longitudinal section view of an open end water rod collector and distributor;

FIG. 2B is a cross-section taken along the line 2B—2B.

FIG. 3A is a longitudinal section view of a flexible cloud end water rod collector and distributor;

FIGS. 3B and 3C are cross-sectional views of alternative embodiments taken along the line 3B—3B of FIG. 3A;

FIGS. 4A and 4B are longitudinal section views of body configurations for the water rod;

FIGS. 4C and 4D are cross-sectional views of the body configurations taken along the lines 4C—4C and 4D—4D respectively of FIGS. 4A and 4B respectively.

FIG. 5A is a longitudinal section of a bottom vented water rod collector and distributor; and, FIG. 5B is a cross-sectional view taken along the line 5B—5B of FIG. 5A.

DETAILED DESCRIPTION OF THE INVENTION

The large water rod of a fuel assembly of the present invention is intended to serve dual functions. During normal power generation operation as shown in FIG. 1A, the large water rod 10 serves to provide water as a moderator to provide a more uniform power distribution through the fuel bundle. As is conventional, a channel C with fuel rods 11, allows inflowing water from lower tie plate 12 to generate steam. Steam is generated within channel C and flows out upper tie plate 14.

The inventive aspect of the process and apparatus is the ability of the large water rod to serve as an efficient radiation heat sink when a LOCA occurs. For the large water rod 10 to be an effective heat sink. it must be kept cool by water flow on the inside. Experiments and analysis have shown that unless at least a thin film of water on the inner surface of the large water rod is achieved, it provides little or no benefit for high-temperature LOCAs.

Calculations have shown that a large cooled water rod of 1.37 inches diameter implemented in a fuel bundle provides a benefit of about 250° F. in the Peak Cladding Temperature (PCT) for a boiling water reactor in situations where prolonged core recovery occurs. The PCT, as calculated with typical licensing assumptions. was reduced from approximately 2000° F. to 1750° F.

Nuclear reactor operation is limited by accident performance requirements. As a result, power plants operate at their rated power by giving up fuel cycle benefits or are power derated. A reduced PCT and the associated decreased amount of cladding oxidation would significantly improve the plant safety margins and flexibility for plant operation.

During a loss of coolant accident (LOCA), emergency cooling water is sprayed on upper tie plate 14. Water flows downwardly among the fuel rods 11. More importantly, and as directly pertinent to the disclosure herein, water flows into the large water rod 10. Specifically, the water is collected for flow into the large water rod, distributed for flow at the large water rod sidewalls, and thereafter given a flow path down the large water rod sidewalls. This flow path down the large water rod sidewalls separates the cooling water flow from the rising steam generated by the cooling function of the water. Steam generated by the cooling water flows upwardly and centrally of the large water rod. At the top of the large water rod, the distributor gives this rising steam a separate path out the top of the fuel bundle. Interference of the rising steam with the cooling water is prevented.

The disclosed improvement to the fuel bundle and water rods of the present invention encompass the following major components:
1. a collector;
2. a distributor; and
3. a modified water rod body.

Two existing types of water rod design are considered. The first type is a top-vented design, where the steam generated inside the water rod during a LOCA is vented through the top of the water rod. The main feature of this design is to separate the counter-current flows of steam and liquid, such that the upwardly flowing steam does not prevent sufficient liquid from being collected and flowing downwardly inside of the water rod. The controlling resistance for the water flow during normal operation is at the bottom with a relatively large exit flow area at the top.

The second type is a bottom vented design. In this design the steam generated inside the water rod during LOCA is vented through the bottom of the water rod. The steam and water flows inside the water rod are concurrent. Thus, special precautions to separate the flow paths are not necessary. Here, the water flow during normal operation is controlled by orificing at the top with a relatively large inlet flow area at the bottom. Each type of water rod and its associated water rod apparatus is discussed separately.

Top Vented Water Rods

In general, a cylindrical collector is attached to the top end of a water rod body and terminates just below or passes through an opening in the upper tie plate. The collector serves to collect Emergency CCS water as it sprays all over the upper plenum of the core. The collector also serves as the conduit of the water to the distributor portion of the apparatus. The distributor then directs the water flow along the interior walls of the water rod body and separates an upward flow path for steam.

Two types of water rod construction are contemplated. FIG. 2A illustrates the first type in which the water rod has an open top end terminating just below or passing through the tie plate. FIG. 3A illustrates the second type in which the water rod has a closed top end which terminates in a flexible end which is actually attached to the upper tie plate.

Referring to FIG. 2A, the collector 20 for an open end water rod consists of a cylindrical section disposed just below or passing through the upper tie plate 40. In order to collect cooling spray water, the upper open end of the collector must be vertically aligned to some extent with openings 60 in the upper tie plate 40, or penetrate the upper tie plate.

The distributor 100 of the apparatus is located immediately below the collector. It is also a cylindrical section which has an orificed cap 120 at its upper end which acts as a funnel to direct the collected water flow along the interior wall surfaces of the water rod body 130. As can be seen in FIG. 2B. the distributor 100 defines a number of annular liquid film passages 121, 122, 123 and 124 along the periphery of the cylindrical section. These passages define the downward flow of water into and along the inner wall surfaces of the water rod body. The uninterrupted segments of the distributor wall periphery, identified as segments 125, 126, 127 and 128 are in open communication with the large central opening 140 of the distributor. Adjacent the uppermost end of the distributor, each segment 125, 126, 127 and 128 is provided with steam vents 151, 152, 153 (in FIG. 2A) to provide openings for the steam which flows upwardly through the center portion 140 of the distributor 100. In this way, the counterflowing steam and water are separated so that the upward flow of steam does not inhibit the downward flow of water in the event of a LOCA. During normal operation, the vents 151, 152 and 153 as well as the annular passages 121, 122, 123 and 124 serve to discharge the water flow through the rod.

FIG. 3A illustrates the flexible closed end type of water rod. In this case, the collector portion is a frusto-conical annular cup surrounding the flexible end 180. The structure shown feeds collected liquid flowing through the upper tie plate to the water rod body via separate liquid flow channels. The distributor in FIG. 3A feeds the liquid to the inner periphery of the water rod via flow channels configured either as annular ducts 201 (FIG. 3B) or as a manifold of small tubes 204 (FIG. 3C). The updrafting vapor flows through openings in the top of the water rod as well as through holes in the flexible end, which serve as the water discharge during normal operation. The vapor is then discharged through openings between the ducts or tubes making up the distributor.

The main body of the water rod is a tube that contains structures to minimize the effects of interfacial shear between the downflowing liquid and updrafting steam produced by the radiant energy incident on the water rod in the event of a LOCA.

Two alternative embodiments for the water rod body are shown in FIGS. 4A, 4B, 4C and 4D. FIG. 4C is a cross-sectional view of the water rod body shown in FIG. 4A while FIG. 4D is a cross-sectional view of the water rod body of FIG. 4B.

The embodiment of FIG. 4A illustrates a water rod body 220 containing a perforated cylinder or wire mesh sleeve or insert 240 having an outer diameter slightly smaller than the inner diameter of the water rod body 220. The openings of the insert 240 permit steam to escape into the large central opening of the water rod body. This prevents the upward steam flow from hindering the downward flow of water along the inner wall surfaces of the water rod body.

FIG. 4B illustrates grooved insert 260 placed concentrically within the water rod body 220. The grooves of insert 260 increase the surface area available for water flow, in turn enhancing the heat transfer area available as a radiation sink. Also, the insert 260 provides a boundary for the water flow passage separate from the steam flow path through the center of the water rod body.

The water rod bodies of FIGS. 4A–4D cover a minimum of six feet along the length of the water rod. Either embodiment of the water rod body can be used in combination with the previously discussed collectors and distributors.

Bottom Vented Water Rod

As is known in the art, water rods can be vented at the bottom. This is typically done at an aperture in the water rod sidewall at the bottom portion of the rod (not shown). The collector for the bottom vented water rod serves the same purpose as for the top vented water rod, and either of the two designs previously discussed can be used.

The distributor 280 feeds the collected water around the inside surface 300 of the water rod. The distributor 280, which is shown in FIG. 5A, consists of a flat insert with holes 320 around the periphery, through which the collected water will feed along the inside surface of the water rod. During normal operation holes 320 serve as the flow restriction controlling the flow through the water rod. The distributor is placed a short distance down the water rod, such that the static head of water building up on top of the distributor is sufficient to overcome the frictional pressure drop of the steam venting through the bottom of the water rod.

The main body of the water rod can be provided with grooves as shown in FIGS. 4B and 4D. The grooves added to the inside tube wall increase the inside surface area to enhance heat transfer and speed up any quenching process.

Other alternative embodiments which achieve equivalent features of the present invention would be apparent to those skilled in the art. From the above description. it is intended that this disclosure be taken in an exemplary sense, and the scope of protection afforded be determined by the appended claims.

What is claimed is:

1. In a nuclear reactor having overhead core cooling spray; a fuel assembly having an upper tie plate; a lower tie plate; a channel connecting said tie plates; a plurality of fuel rods in side by side upstanding relation between said tie plates and within said channel; a large moderating water rod for neutron moderation within said channel and between said tie plates, said large rod being at least twice the diameter of said fuel rods, the improvement to said fuel assembly at said large water rod comprising:
   a collector disposed through said upper tie plate at the upper end of the large moderating water rod for collecting core cooling spray;
   a distributor disposed between said collector and said large moderating water rod, said distributor positioned with respect to said large moderating water rod to direct the collected core cooling spray in a downward flow on and along an interior wall surface of said large moderating water rod whereby collected core cooling spray provides a radiation heat sink on and along the interior wall surface of said large moderating water rod.

2. The nuclear reactor fuel assembly of claim 1, wherein said collector comprises a cylindrical section open at the top attached to the upper end of the large moderating rod, said cylindrical section disposed vertically beneath an opening in the upper tie plate.

3. The nuclear reactor fuel assembly of claim 1, wherein said collector comprises a cylindrical section open at the top attached to the upper end of the large moderating rod, said cylindrical section extending through the upper tie plate.

4. The nuclear reactor fuel assembly of claim 1, wherein said distributor comprises a cylindrical section having longitudinal water passages disposed along its periphery which are arcuate and annular, said distributor further including steam passages comprising circumferentially spaced openings through the distributor wall, said openings disposed between said water passages.

5. The nuclear reactor fuel assembly of claim 1, wherein said collector comprises a frustoconical section with a first end having a relatively large diameter end upwardly disposed proximate an upper tie plate and a second end having a relatively small diameter end downwardly disposed.

6. The nuclear reactor fuel assembly of claim 5, wherein said distributor comprises a cylindrical section having a first section which is frustoconical and a second section which has a constant diameter, said first and second sections of said distributor defining an annular circumferential water passage to direct water flow on and over the inside walls of the moderating rod, said distributor further including steam openings along its exterior walls and an annular steam passage in gaseous communication with said openings, said annular steam passage separated from said water passage by said first and second sections.

7. The nuclear reactor fuel assembly of claim 5, wherein said distributor comprises a cylindrical section conjoined with and immediately below said collector, said distributor further comprising a manifold formed from a plurality of circumferentially spaced tubes disposed within the inside wall of said cylindrical section.

8. The nuclear reactor fuel assembly of claim 1, and wherein said water rod is bottom vented.

9. The nuclear reactor fuel assembly of claim 1, wherein said large moderating water rod comprises a tube which is cylindrical and extends longitudinally through the fuel assembly, said large moderating water rod further comprising an interior liner tube having a corrugated wall.

10. The apparatus of claim 8, wherein said distributor comprises a circular plate disposed beneath said collector and within said rod body, said circular plate disposed generally perpendicular to the longitudinal axis of the moderating rod, said circular plate further including circumferential openings along its peripheral edges disposed for the inflow of water.

11. A process for providing a radiation heat sink for fuel bundles having a large water moderator tube in the event of a loss of coolant accident said fuel bundles having an upper tie plate, a lower tie plate, a channel surrounding and connecting said tie plate, a pluraltiy of fuel rods supported between said tie plates and within said channels in side by side upstanding relation; a large water moderator tube having at least twice the diameter of said fuel rods; said process comprising the steps of:
   spraying core cooling spray in an evenly divided flow over said upper tie plate;
   collecting core cooling spray at an upper end of the large water moderator tube; and
   distributing the core cooling spray circumferentially along the inner surfaces of the large water moderator tube in a downward flow separating the flow of the core cooling spray from the flow of steam resulting from the flashing of water to steam within the moderator tube.

12. The process of claim 11 and wherein said separating step includes:
providing a steam flow path from the center of said large moderator tube to the exterior of said large moderator tube at the upper end of said large water moderator tube.

* * * * *